US010869335B2

(12) United States Patent
Wei

(10) Patent No.: US 10,869,335 B2
(45) Date of Patent: *Dec. 15, 2020

(54) USER EQUIPMENT, BASE STATION AND METHOD FOR CONDUCTING DEVICE-TO-DEVICE COMMUNICATIONS

(71) Applicant: Sony Corporation, Tokyo (JP)

(72) Inventor: Yuxin Wei, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/280,273

(22) Filed: Feb. 20, 2019

(65) Prior Publication Data

US 2019/0182861 A1 Jun. 13, 2019

Related U.S. Application Data

(63) Continuation of application No. 15/108,673, filed as application No. PCT/CN2015/071301 on Jan. 22, 2015, now Pat. No. 10,285,196.

(30) Foreign Application Priority Data

Jan. 24, 2014 (CN) .......................... 2014 1 0035377

(51) Int. Cl.
*H04W 72/04* (2009.01)
*H04W 40/00* (2009.01)
(Continued)

(52) U.S. Cl.
CPC ......... *H04W 74/006* (2013.01); *H04L 1/0041* (2013.01); *H04L 1/1607* (2013.01);
(Continued)

(58) Field of Classification Search
CPC . H04W 74/006; H04W 52/18; H04W 74/004; H04W 76/14; H04W 4/90;
(Continued)

(56) References Cited

U.S. PATENT DOCUMENTS 9,629,192 B2 * 4/2017 Zeng ................. H04W 72/0453
2009/0325625 A1 * 12/2009 Hugl ..................... H04W 52/16
455/522
(Continued)

FOREIGN PATENT DOCUMENTS

CN 102983944 A 3/2013
CN 103002578 A 3/2013
(Continued)

OTHER PUBLICATIONS

3GPP TSG-RAN WG1 Meeting #75 Fujitsu "Further Analysis on Control Information for D2D Communication" (Year: 2013).*
(Continued)

*Primary Examiner* — Edan Orgad
*Assistant Examiner* — Vanneilian Lalchinthang
(74) *Attorney, Agent, or Firm* — Xsensus, LLP

(57) ABSTRACT

A user equipment, base station, and method for conducting device-to-device communications. A wireless communication system includes the user equipment and another user equipment. The user equipment includes: a control unit; and a transmission unit controlled by the control unit and used for transmitting control information to another user equipment by an uplink channel, wherein the control information includes at least one of data transmission format information and power control information. With the user equipment, base station, and method, the efficiency of communication between devices conducting device-to-device communications can be increased, thereby improving data transmission performance.

21 Claims, 9 Drawing Sheets

(51) Int. Cl.

| | | |
|---|---|---|
| *H04W 74/00* | (2009.01) | |
| *H04L 5/00* | (2006.01) | |
| *H04W 76/14* | (2018.01) | |
| *H04L 1/00* | (2006.01) | |
| *H04L 1/16* | (2006.01) | |
| *H04L 1/18* | (2006.01) | |
| *H04L 27/26* | (2006.01) | |
| *H04W 52/18* | (2009.01) | |
| *H04W 74/04* | (2009.01) | |

(52) U.S. Cl.
CPC .......... *H04L 1/1812* (2013.01); *H04L 1/1861* (2013.01); *H04L 5/0007* (2013.01); *H04L 5/0053* (2013.01); *H04L 27/2601* (2013.01); *H04W 52/18* (2013.01); *H04W 74/004* (2013.01); *H04W 74/04* (2013.01); *H04W 76/14* (2018.02)

(58) Field of Classification Search
CPC ....... H04W 72/121; H04W 4/70; H04W 4/08; H04L 1/0041; H04L 1/1607; H04L 1/1812; H04L 1/1861; H04L 27/2601; H04L 5/0007; H04L 5/0053
USPC .......................................................... 370/329
See application file for complete search history.

(56) References Cited

U.S. PATENT DOCUMENTS

| | | | | |
|---|---|---|---|---|
| 2011/0268006 | A1* | 11/2011 | Koskela ................ | H04W 4/70 370/312 |
| 2013/0343322 | A1* | 12/2013 | Lee ...................... | H04B 7/2656 370/329 |
| 2014/0185530 | A1* | 7/2014 | Kuchibhotla .......... | H04W 4/90 370/329 |
| 2014/0206372 | A1 | 7/2014 | Zeng et al. | |
| 2014/0274196 | A1* | 9/2014 | Dai ...................... | H04W 52/242 455/522 |
| 2016/0173239 | A1* | 6/2016 | Kim ..................... | H04L 1/1812 370/329 |
| 2016/0183212 | A1* | 6/2016 | Suzuki ................. | H04W 16/14 370/330 |
| 2016/0249336 | A1* | 8/2016 | Jung .................... | H04W 76/14 |

FOREIGN PATENT DOCUMENTS

| | | |
|---|---|---|
| CN | 103037359 A | 4/2013 |
| CN | 103139889 A | 6/2013 |

OTHER PUBLICATIONS

3GPP TS 36.211 V11.4.0 (Sep. 2013), 3rd Generation Partnership Project; Technical Specification Group Radio Access Network; Evolved Universal Terrestrial Radio Access (E-UTRA); Physical channels and modulation (Year: 2013).*
Extended European Search Report dated Oct. 13, 2017 in Patent Application No. 15740505.1.
Nokia, NSN, et al., "D2D Communication within network coverage", 3GPP TSG-RAN WG1 Meeting #74, 7.2.8.1, R1-133494, XP050716601, Aug. 19-23, 2013, 4 pages.
ZTE, "Study on D2D Resource Allocation", 3GPP TSG-RAN WG1 Meeting #75, 6.2.8.1.3, R1-135370, XP050735052, Nov. 11-15, 2013, 10 pages.
Partial Supplementary European Search Report dated Aug. 10, 2017 in Patent Application No. 15740505.1.
Fujitsu: "Further Analysis on Control Information for D2D Communication", 3GPP TSG RAN WG1 Meeting# 75, R1-135141, vol. RAN WG1, No. San Francisco, XP050734843, Nov. 11-15, 2013, 3 pages.
ZTE: "Control Channel Design for D2D link", 3GPP TSG-RAN WG1 Meeting # 75; R1-135369, vol. RAN WG1, No. San Francisco, XP050735051, Nov. 11-15, 2013, 5 pages.
General Dynamics Broadband UK: "Prose Device-to-Device Communication Control Channel Design", 3GPP TSG-RAN1 # 75; R1-135495, vol. RAN WG1, No. San Francisco, XP050735168, Nov. 11-15, 2013, 4 pages.
3GPP TS 36.211, "3rd Generation Partnership Project; Technical Specification Group Radio Access Network; Evolved Universal Terrestrial Radio Access (E-UTRA); Physical channels and modulation (Release 11)", 3GPP Standard; vol. RAN WG1, No. V11.4.0, XP050712717, Sep. 2013, pp. 1-120.
"3GPP TS 36.211 V11.4.0 (Sep. 2013)""3rd Generation Partnership Project; Technical Specification Group Radio Access Network;Evolved Universal Terrestrial Radio Access (E-UTRA); Physical Channel and Modulation (Release 11)"" (Year: 2013)".
Combined Office Action and Search Report dated Jan. 24, 2018 in Chinese Patent Application No. 201410035377.0 (with English translation of categories of cited documents) 7 pages.
International Search Report dated Apr. 27, 2015, in PCT/CN2015/071301 filed Jan. 22, 2015.

* cited by examiner

| | | | | | | | | | | | | |
|---|---|---|---|---|---|---|---|---|---|---|---|---|
| 6 | 4 | 2 | 1 | 2 | | | | 2 | 1 | 2 | 4 | 6 |
| 6 | 4 | 2 | 1 | 2 | | | | 2 | 1 | 2 | 4 | 6 |
| 6 | 4 | 2 | 1 | 2 | | | | 2 | 1 | 2 | 4 | 6 |
| 6 | 4 | 2 | 1 | 2 | | | | 2 | 1 | 2 | 4 | 6 |
| | | | 1 | | | | | | 1 | | | |
| 7 | 7 | 7 | 1 | 7 | 7 | 7 | 7 | 7 | 1 | 7 | 7 | 7 |
| 7 | 7 | 7 | 1 | 7 | 7 | 7 | 7 | 7 | 1 | 7 | 7 | 7 |
| | | | 1 | | | | | | 1 | | | |
| | | | 1 | | | | | | 1 | | | |
| | | | 1 | | | | | | 1 | | | |
| | | | 1 | | | | | | 1 | | | |
| | | | 1 | | | | | | 1 | | | |
| | | | 1 | | | | | | 1 | | | |
| | | | 1 | | | | | | 1 | | | |
| | | | 1 | | | | | | 1 | | | |
| | | | 1 | | | | | | 1 | | | |
| | | | 1 | | | | | | 1 | | | |
| | | | 1 | | | | | | 1 | | | |
| | | | 1 | | | | | | 1 | | | |
| | 5 | 3 | 1 | 3 | 5 | | | 5 | 3 | 1 | 3 | 5 |
| | 5 | 3 | 1 | 3 | 5 | | | 5 | 3 | 1 | 3 | 5 |
| | 5 | 3 | 1 | 3 | 5 | | | 5 | 3 | 1 | 3 | 5 |
| | 5 | 3 | 1 | 3 | 5 | | | 5 | 3 | 1 | 3 | 5 |

Fig.11

USER EQUIPMENT, BASE STATION AND METHOD FOR CONDUCTING DEVICE-TO-DEVICE COMMUNICATIONS

CROSS-REFERENCE TO RELATED APPLICATIONS

This application is a continuation of U.S. patent application Ser. No. 15/108,673, filed on Jun. 28, 2016, which is a National Stage Entry of International Patent Application No. PCT/CN2015/071301, filed on Jan. 22, 2015, and claims priority to Chinese Patent Application 201410035377.0, filed in the Chinese Patent Office on Jan. 24, 2014, the entire contents of which is hereby incorporated herein by reference in its entirety.

FIELD

The present disclosure relates to the technical field of wireless communication, and in particular to a user equipment, a base station and a method for performing D2D (Device-to-Device) communication in a wireless communication system.

BACKGROUND

This section provides background information related to the present disclosure, which is not necessarily the conventional technology.

The explosive growth of user data improves the requirement for a data transmission rate and transmission efficiency. With increasing communication load between a user and a base station, direct communication is performed between geographical adjacent devices without relay of the base station, in this case, not only load of the base station can be reduced but also a signal is good due to a small communication distance. Furthermore, transmitting power between the devices may be low, which is beneficial to reduce communication interference to other devices. D2D communication technology is developed under such background.

The D2D communication changes the conventional user-to-base-station communication mode, a part of functions of the base station are conveyed to a user equipment, hence, it is a challenge to design protocols for both a physical layer, an MAC (Media Access Control) layer and a high layer.

SUMMARY

This section provides a general overview for the present disclosure, rather than the full disclosure for all scope or all features of the present disclosure.

An object of the present disclosure is to provide a user equipment, a base station and a method for performing D2D communication in a wireless communication system, to raise efficiency of communication between D2D devices by designing reasonable control signaling, thereby improving data transmission performance.

According to an aspect of the present disclosure, a user equipment for performing D2D communication in a wireless communication system including at least the user equipment and another user equipment is provided, the user equipment includes: a control unit; and a transmitting unit controlled by the control unit for transmitting control information to the another user equipment via an uplink channel, wherein the control information includes at least one of data transmission format information and power control information.

According to another aspect of the present disclosure, a base station for performing D2D communication in a wireless communication system including a first user equipment, a second user equipment and the base station is provided. The base station includes: a control unit; a receiving unit controlled by the control unit for receiving a signal from the first user equipment; and a transmitting unit controlled by the control unit for transmitting uplink scheduling grant information to the first user equipment with a PDCCH (Physical Downlink Control Channel) when the receiving unit receives a D2D SR (Scheduling Request), to perform D2D communication between the first user equipment and the second user equipment from the first user equipment, where the control unit makes a representation of whether a resource is allocated for device-to-device or device-to-base-station by adding a bit to the uplink scheduling grant information.

According to another aspect of the present disclosure, an electronic device at a base station side applicable to a wireless communication system including a first user equipment, a second user equipment and the base station is provided, the electronic device includes: a processing circuit configured to generate uplink scheduling grant information for D2D communication to be performed between the first user equipment and the second user equipment based on a D2D Scheduling Request, SR, relative to the D2D communication from the first user equipment; and map the uplink scheduling grant information onto a Physical Downlink Control Channel, PDCCH, to indicate a resource for the first user equipment to perform the D2D communication.

According to another aspect of the present disclosure, an electronic device at a user equipment side applicable to a wireless communication system including the user equipment, another user equipment and a base station is provided, the electronic device includes: a processing circuit configured to generate a D2D Scheduling Request, SR, for requesting performing D2D communication between the user equipment and the another user equipment to the base station; and map the D2D Scheduling Request, SR, onto a Physical Uplink Control Channel PUCCH, to indicate a resource for the D2D communication requested by the user equipment.

According to another aspect of the present disclosure, a communication method at a base station side applicable to a wireless communication system including a first user equipment, a second user equipment and the base station is provided, the method includes: generating uplink scheduling grant information for D2D communication to be performed between the first user equipment and the second user equipment based on a D2D Scheduling Request, SR, relative to the D2D communication from the first user equipment; and mapping the uplink scheduling grant information onto a Physical Downlink Control Channel, PDCCH, to indicate a resource for the first user equipment to perform the D2D communication.

According to another aspect of the present disclosure, a communication method at a user equipment side applicable to a wireless communication system including the user equipment, another user equipment and a base station is provided, the method includes: generating a D2D Scheduling Request, SR, for requesting performing D2D communication between the user equipment and the another user equipment to the base station; and mapping the D2D Scheduling Request, SR, to a Physical Uplink Control Channel PUCCH, to indicate a resource for the D2D communication requested by the user equipment.

According to another aspect of the present disclosure, a user equipment for performing D2D communication in a wireless communication system including at least the user equipment and another user equipment according to the present disclosure is provided, the user equipment includes: a control unit; and a receiving unit controlled by the control unit for receiving control information transmitted by the another user equipment, where the control information includes at least one of data transmission format information and power control information.

According to another aspect of the present disclosure, a method for performing D2D communication in a wireless communication system including at least a first user equipment and a second user equipment is provided, the method includes: transmitting, by the first user equipment, control information to the second user equipment via an uplink channel, where the control information includes at least one of data transmission format information and power control information.

By using the user equipment, the base station and the method for performing D2D communication in the wireless communication system according to the present disclosure, a user equipment transmits the control information including at least one of the data transmission format information and the power control information to another user equipment via the uplink channel. The efficiency of communication between D2D equipments can be raised by such design, thereby improving the data transmission performance.

A further applicable scope will become apparent based on the description provided herein. The description and specific examples in the overview are only for schematic purposes and are not intended to limit the scope of the present disclosure.

BRIEF DESCRIPTION OF THE DRAWINGS

The drawings described herein are only for schematic purposes of the selected embodiments rather than all possible implementation, and are not intended to limit the scope of the present disclosure. In the drawings.

FIG. 11 is a flowchart showing a resource mapping mode in a case that control information and data information are transmitted simultaneously according to an embodiment of the present disclosure;

Figure 1A:
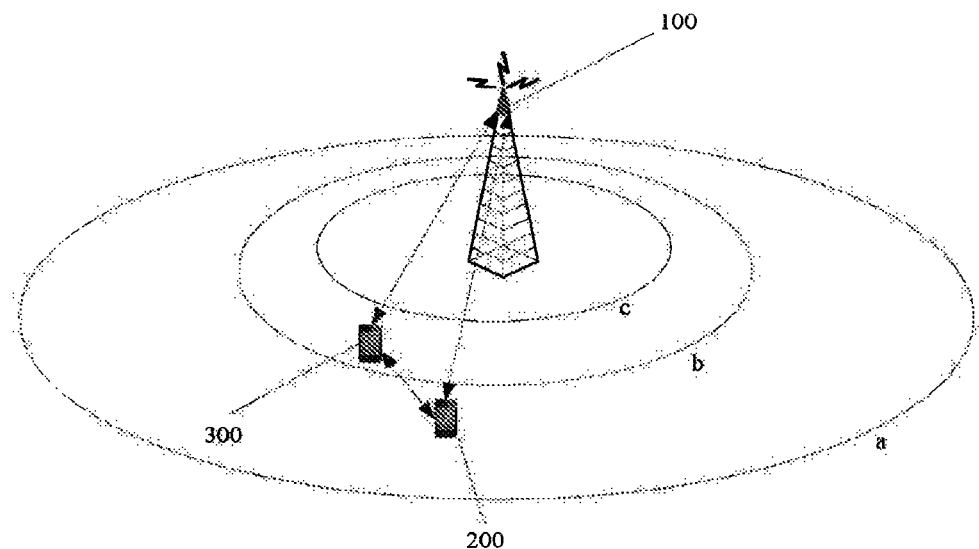
FIG. 1a is a schematic diagram showing a scenario for performing D2D communication in a wireless communication system according to an embodiment of the present disclosure.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention of the present disclosure is to cover all modifications, equivalents, and alternatives falling within the spirit and scope of the present disclosure. Note that corresponding reference numerals indicate corresponding parts throughout the several views of the drawings.

DETAILED DESCRIPTION OF THE EMBODIMENTS

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those skilled in the art. Numerous specific details are set forth such as examples of specific components, devices, and methods, to provide a thorough understanding of embodiments of the present disclosure. It will be apparent to those skilled in the art that specific details need not be employed, that example embodiments may be implemented in many different forms and that neither should be construed to limit the scope of the disclosure. In some example embodiments, well-known processes, well-known structures, and well-known technologies are not described in detail.

The present disclosure relates to D2D (Device-to-Device) communication in a wireless communication network. A device related to the present disclosure includes but not limited to a terminal having a wireless communication function such as a mobile terminal, a computer or a vehicle equipment. For a challenge brought to control signaling on a physical layer due to the introduction of D2D technology, control signaling applicable to the D2D communication is designed in the present disclosure.

Based on the current standardization process, it is unanimously decided that the D2D communication is performed in an uplink resource. Compared with the conventional technology, the D2D communication has the following differences.

First, in the conventional design for the uplink control signaling, the base station completely controls actions of the terminal, and has known which mode (a modulation and demodulation mode, the size of a transmission block) the uplink data is transmitted in before the data is transmitted, hence, the uplink control signaling does not need to carry related transmission information. However, in D2D peer-to-peer communication, the information must be agreed upon between communication equipments.

Second, in an HARQ (Hybrid Automatic Repeat Request) process of the conventional user-to-base-station communication, a confirmation for the received downlink channel is transmitted over an uplink control channel. A PHICH (Physical Hybrid ARQ Indicator Channel) is designed for the downlink channel to transmit a confirmation for uplink data. In the D2D communication, it is necessary to transmit the confirmation for the downlink data over the uplink channel, hence, the uplink control channel needs to be changed.

Third, in a case that the D2D communication and the conventional user-to-base-station communication are performed simultaneously, the control signaling thereof must be designed so that a resource is allocated reasonably in the two communication modes.

To this end, it is necessary to consider the following problems: information, necessary for the D2D communication, carried on the control channel; a format design for the control channel and a correspondence between the format design for the control channel and transmission resource; a transmission mode of the control information, and the like.

The present disclosure aims at providing a user equipment, a base station and a method for performing the D2D communication in a wireless communication system, to solve at least one of the above problems.

Figure 1B:
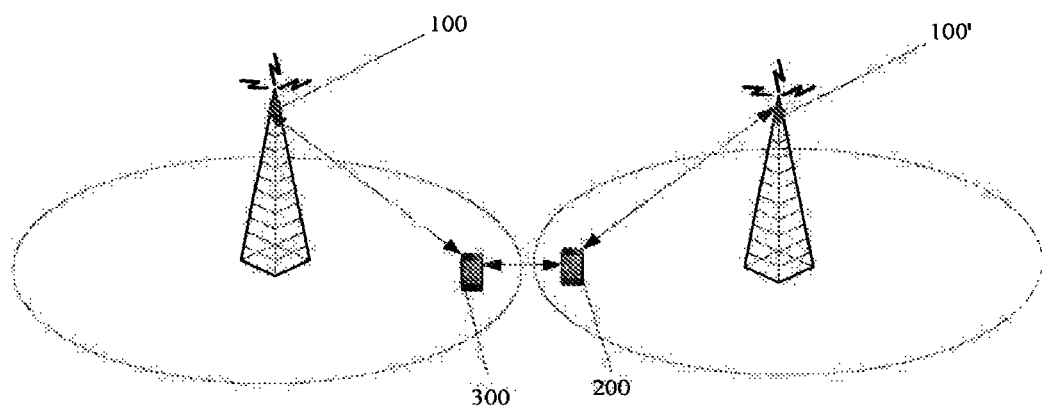
FIG. 1b is a schematic diagram showing another scenario for performing D2D communication in a wireless communication system according to an embodiment of the present disclosure.

FIG. 1a and FIG. 1b show two scenarios for performing D2D communication in a wireless communication system according to the embodiments of the present disclosure. In the scenario as shown in FIG. 1a, D2D communication is performed between a UE (User Equipment) 200 and a UE 300 in the wireless communication system. The UE 200 and the UE 300 perform a direct communication within a monitoring area of a base station 100 in a case that both the UE 200 and the UE 300 fall within a coverage area a of the base station 100. On the other hand, in a case that the coverage area of the base station is small, one (the UE 200) of the UE 200 and the UE 300 may be located outside of the coverage area of the base station 100 (as shown by the curve b in FIG. 1), or both the UE 200 and the UE 300 are located outside of the coverage area of the base station 100 (as shown by the curve c in FIG. 1). In the scenario as shown in FIG. 1b, the UE 300 belongs to a cell in which the base station 100 is located and is located at the edge of the cell, and the UE 200 belongs to a cell in which a base station 100' is located and is located at the edge of the cell, and the UE 300 and the UE 200 perform D2D communication in the wireless communication system. The technical solution according to the embodiments of the present disclosure is applicable to any one of the above scenarios. In addition, it will be realized by those skilled in the art that, although only two UEs are shown in FIG. 1a and FIG. 1b, the number of UEs in the wireless communication system may be three or more, which is not specially limited in the present disclosure.

It is provided in the present disclosure that peripheral devices (such as the UE 200 and the UE 300) are found by a discovering signal between D2D equipments, then the D2D communication is performed. Before this, certain control signaling is transmitted to implement real D2D communication.

Control information and data information may be transmitted separately or in a merged way in a case that the D2D communication is performed between the UE 200 and the UE 300. In a case that the control information and the data information are transmitted separately, the base station 100 may participate in the D2D communication performed between the UE 200 and the UE 300, or may not participate in the D2D communication performed between the UE 200 and the UE 300. In a case that the control information and the data information are transmitted in a merged way, the base station 100 does not participate in the D2D communication performed between the UE 200 and the UE 300.

Figure 2:
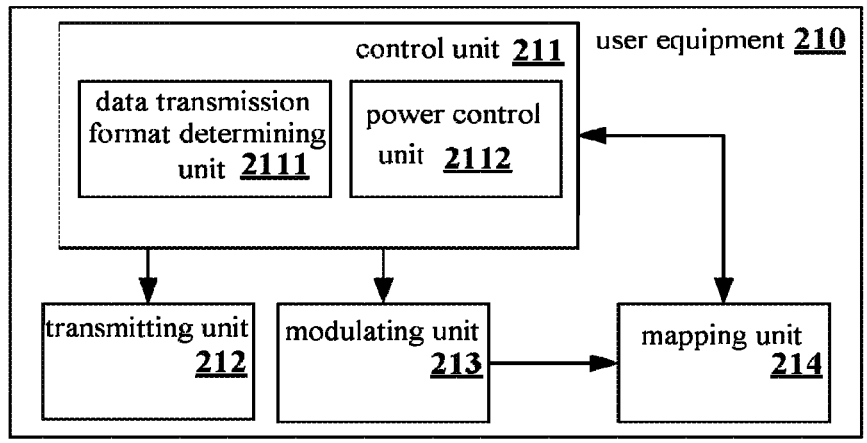
FIG. 2 is a block diagram showing a structure of a user equipment according to an embodiment of the present disclosure.

FIG. 2 shows a structure of a UE 210 according to an embodiment of the present disclosure. As shown in FIG. 2, the UE 210 may include a control unit 211 and a transmitting unit 212. The UE 210 may further include a modulating unit 213 and a mapping unit 214. Furthermore, the control unit 211 may further include a data transmission format determining unit 2111 and a power control unit 2112.

The transmitting unit 212 is controlled by the control unit 211, and may be for transmitting control information to another UE via an uplink channel. Here, the control information may include at least one of data transmission format information and power control information.

For example, the data transmission format information may include at least one of: transmission block allocation for allocating a resource block transmitted on a PUSCH (Physical Uplink Shared Channel) of the opposite equipment, for example, the transmission block allocation may have a same or similar format as resource block assignment bits in the 3GPP standard; MCS (Modulation and Coding Scheme) which, for example, occupies 5 bits for indicating a modulation and coding format; new data indication, which, for example, occupies 1 bit for identifying whether the data is new data or retransmission data, for example, the new data indication may have a same or similar format to a new data indicator in the 3GPP standard; and a cell ID and a cell bandwidth for calculating frequency hopping mapping from a virtual resource block to a physical resource block.

For example, the power control information may include a power control command indication (the number of bits thereof is determined based on a specific power control scheme) for indicating a power control mode of the opposite equipment. For example, the power control information may have a same or similar format as a TPC command in the 3GPP standard.

As mentioned above, in the conventional design for uplink control signaling, the base station completely controls actions of a terminal, and has known which mode the uplink data is transmitted in before the data is transmitted, hence, the uplink control signaling does not need to carry related transmission information. However, in D2D peer-to-peer communication, this information must be agreed upon between communication equipments. Hence, the control information including at least one of the data transmission format information and the power control information transmitted to another UE by the transmitting unit 212 of the UE 210 via the uplink channel may be agreed upon between the UE 210 and another UE, thereby performing the D2D communication. It should be noted that, the UE 210 described above may be a party directly participating in the D2D communication, or may be a UE (such as a cluster head) for providing control for D2D communication performed between other two or more UEs. In the latter case, the UE 210 transmits the control information described above to other at least two UEs via the uplink channel, so that information is agreed upon between the UEs participating in the D2D communication.

According to an embodiment of the present disclosure, the data transmission format determining unit 2111 of the control unit 211 may determine data transmission format information. In particular, for transmission block allocation in the data transmission format information, for example, the data transmission format determining unit 2111 may select an appropriate resource from resource blocks allocated by the base station for the D2D communication, based on the size of traffic and interference situation, or select a resource which is negotiated in a D2D discovering process before the D2D communication is performed. For the MCS in the data transmission format information, the data transmission format determining unit 2111 may select the MCS based on a channel condition. For example, a high-order modulation and demodulation mode may be used in a case that the channel condition is good. In addition, for example, a low-order modulation and demodulation mode may be used in a case of broadcasting. The new data indication in the data transmission format information is used to identify whether the data is new data or retransmission data. For example, the data transmission format determining unit 2111 may set the new data indication to be 1 in a case of the new data, and may set the new data indication to be 0 in a case of the retransmission data. The data transmission format determining unit 2111 may set the cell ID and the cell bandwidth in the data transmission format information to be a cell ID and a cell bandwidth of a cell where the UE 210 is located.

In a case that the transmission block allocation and the MCS are determined, for example, the data transmission format determining unit 2111 may negotiate with the base station to ensure that: resource allocation for UE-to-UE and resource allocation for UE-to-base-station does not cause serious mutual interference while maximizing respective communication capacity thereof; and no serious mutual interference is caused between different UE-to-UE communication pairs. In a case of no base station, for example, the data transmission format determining unit 2111 may enable no serious mutual interference between different UE-to-UE communication pairs based on a preset algorithm and channel feedback (if any) from other UEs.

According to an embodiment of the present disclosure, the power control unit 2112 of the control unit 211 may determine power control information. In particular, for the power control command indication in the power control information, the power control unit 2112 may use different power control methods based on different communication conditions. Those skilled in the art may use various power control algorithms for the D2D communication, which is not specially limited in the present disclosure.

For example, the power control unit 2112 may adjust transmitting power reasonably based on information such as a distance, relative motion, surrounding interference situation between D2D communication terminals and residual electricity quantity of the terminal by interacting with the base station, so that throughout can be ensured without strongly interfering peripheral equipments.

Furthermore, the control information transmitted by the transmitting unit 212 may further include at least one of channel status report information, HARQ (Hybrid Automatic Repeat Request) confirmation information, transmission priority information and transmission stability indication information.

For example, the channel status report information may include: a channel status transmitting request, for example, which occupies 1 bit for displaying a request to transmit a channel status report; and the channel status report which is a status report for the uplink channel.

For example, the HARQ confirmation information occupies 1 bit for indicating HARQ ACK or NACK, which is a confirmation for UL-SCH (Uplink Shared Channel) received before.

For example, the transmission priority information may include data priority indication, which, for example, occupies 2 bits for identifying a priority of PUSCH transmission data (if any) of a local equipment. The highest priority corresponds to a public security incident. The data priority indication may also be used to distinguish priority between cluster-header-to-user data and user-to-user data in a case that a cluster head exists. A reasonable resource allocation mode may be set by the opposite equipment based on the transmission priority information.

For example, the transmission stability indication information may include data transmission stability indication which, for example, occupies 2 bits for identifying the stability of data transmission (if any) of the local equipment. The D2D communication has a feature of immediacy. Data transmission may be unstable due to factors such as mobility and residual electricity quantity of the terminal, and interference from the peripheral equipments. In a case that the local equipment has a high mobility or has low residual electricity quantity, the transmission stability indication information may be set, so that the opposite equipment determines a receiving mode for subsequent data based on the transmission stability indication information, even initiates a discovering process or a communication process to other equipments again.

It should be noted that, in the above description, preferably, the control information transmitted to another UE from the UE 210 according to the embodiment of the present disclosure includes at least one of the data transmission format information and the power control information, however, which is not intended to limit the present disclosure. For example, the control information transmitted to another UE from the UE 210 via the uplink channel may not include the data transmission format information or the power control information described above, and may include at least one of the channel status report information, the HARQ confirmation information, the transmission priority information and the transmission stability indication information, such technical solution also falls within the scope of the present disclosure.

According to the embodiment of the present disclosure, the transmitting unit 212 may directly transmit the control information to another user equipment by using a PUCCH (Physical Uplink Control Channel). In this case, the base station will not participate in transmission for control signaling between D2D equipments. In order to distinguish from the PUCCH in the conventional technology, hereinafter, the PUCCH in this case is referred to as a DPUCCH (Device PUCCH). In this case, transmitting content, a modulation and demodulation mode of the DPUCCH and a mapping relation between the DPUCCH and time-frequency resource should be designed in consideration of characteristics of the D2D communication.

Based on a classification of the transmission content, the DPUCCH may have at least one of the following formats:

a first DPUCCH format for transmitting at least one of the channel status report information and the HARQ confirmation information;

a second DPUCCH format for transmitting the data transmission format information and the power control information, or for transmitting the data transmission format information, the power control information and at least one of the transmission priority information and the transmission stability indication information; and a third DPUCCH format for transmitting the data transmission format information, the power control information, the channel status report information and the HARQ confirmation information, or for transmitting the data transmission format information, the power control information, the channel status report information, the HARQ confirmation information and at least one of the transmission priority information and the transmission stability indication information.

Specifically, for example, the DPUCCH may have the following formats:

DPUCCH Format 1: the channel status report information;

DPUCCH Format 1a: the channel status report information and the HARQ confirmation information;

DPUCCH Format 1b: the HARQ confirmation information;

DPUCCH Format 2: the data transmission format information and the power control information;

DPUCCH Format 2a: the data transmission format information and the power control information and the transmission priority information and the transmission stability indication information;

DPUCCH Format 3: the data transmission format information and the power control information and the HARQ confirmation information and the channel status report information;

DPUCCH Format 3a: the data transmission format information and the power control information and the HARQ confirmation information and the channel status report information and the transmission priority information and the transmission stability indication information.

Figure 3:
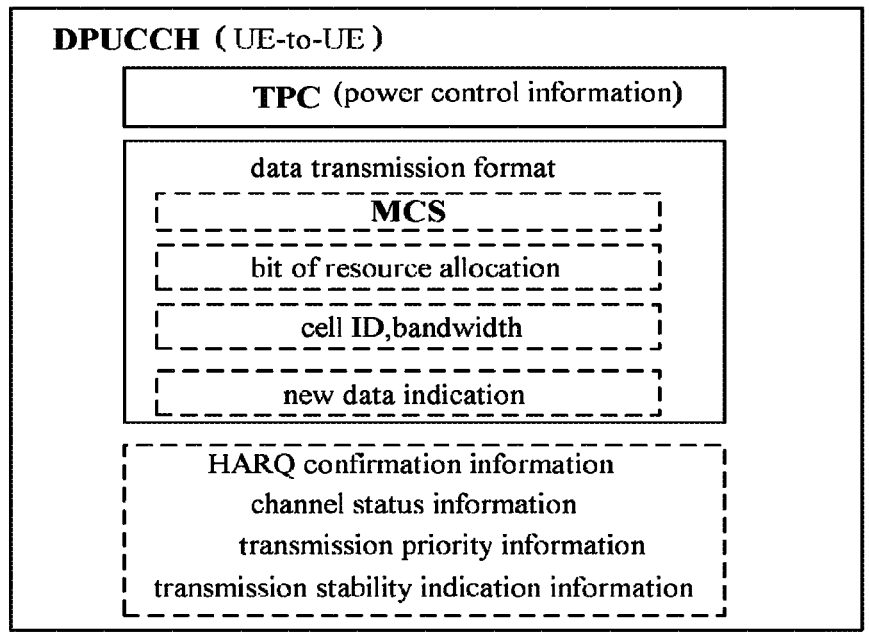
FIG. 3 is a schematic diagram showing an example of content of a PUCCH from a UE to a UE.

FIG. 3 shows an example of content of a PUCCH from a UE to a UE. The PUCCH as shown in FIG. 3 may be considered as the DPUCCH mentioned above. It should be noted that, FIG. 3 is only exemplary to enable the present disclosure to be understood easily, rather than limit the DPUCCH according to the present disclosure.

A modulation and resource mapping mode may be different depending on different transmission formats. In this case, the modulating unit 213 is controlled by the control unit 211 for modulating the DPUCCH into OFDM (Orthogonal Frequency Division Multiplexing) symbols.

Furthermore, the mapping unit 214 is controlled by the control unit 211 for mapping the OFDM symbols onto time slots in subframes. A location of a reference symbol on the time slots may be disposed by the mapping unit 214 depending upon a format of the DPUCCH. Various DPUCCH formats may have various locations of the reference symbol.

For example, the channel status report information and/or the HARQ confirmation information are transmitted when DPUCCH uses the first DPUCCH format (that is, the DPUCCH Format 1, DPUCCH Format 1a or DPUCCH Format 1b above). The channel status report information may have multiple information bits, which data block coding and QPSK (Quadrature Phase Shift Keying) modulation is performed on, and then is converted into OFDM symbols by IFFT (Inverse Fast Fourier Transform) and is mapped.

Figure 4:
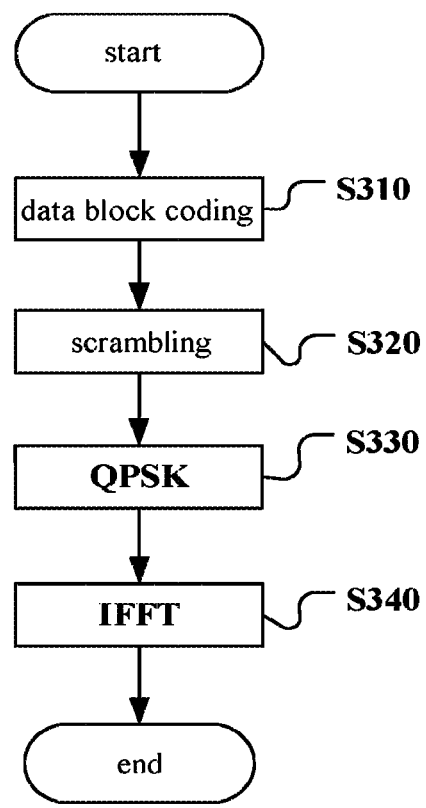
FIG. 4 is a flowchart showing a modulation and coding mode for control signaling according to an embodiment of the present disclosure.

FIG. 4 shows a flowchart of a modulation and coding mode when DPUCCH uses the first DPUCCH format according to an embodiment of the present disclosure. As shown in FIG. 4, the modulating unit 213 may perform a data block coding process S310, a scrambling process S320, a QPSK process S330 and an IFFT process S340 in sequence, the OFDM symbols is obtained in this way. Here, the data block coding process, the scrambling process, the QPSK process and the IFFT process are well-known for those skilled in the art, hence, which are not described in detail in the present disclosure.

Figure 5:
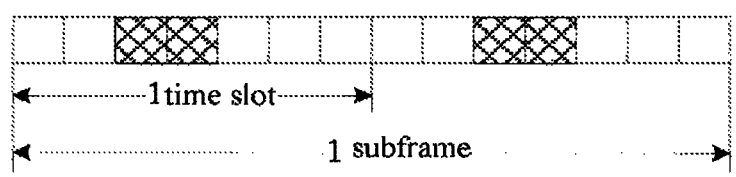
FIG. 5 is a schematic diagram showing a resource mapping mode for control signaling according to an embodiment of the present disclosure.

FIG. 5 shows an example of a resource mapping mode when DPUCCH uses the first DPUCCH format according to an embodiment of the present disclosure. In FIG. 5, a box having a grid represents a reference symbol, and a blank box represents a control symbol.

As shown in FIG. 5, in a case of a normal CP (Cyclic Prefix) length, seven OFDM symbols of one time slot includes two reference symbols for channel measurement and five symbols for transmitting control information. This allocation mode is to balance accuracy of the channel measurement and energy of useful information, and two symbols are enough to reach a performance index for the channel measurement.

Specifically, in an example as shown in FIG. 5, one time slot includes two reference symbols. One time slot includes seven OFDM symbols in a case that the subframe has a normal CP length. The mapping unit 214 may dispose the two reference symbols at a location of a third OFDM symbol and a location of a fourth OFDM symbol respectively in a case that the DPUCCH uses the first DPUCCH format.

One time slot only includes six OFDM symbols in a case that an extended CP length is required for the D2D communication. In this case, the last one OFDM symbol on each time slot having the normal CP length is removed by the mapping unit 214, and the symbol number and the mapping of the reference signals are unchanged.

Specifically, one time slot includes two reference symbols. One time slot includes six OFDM symbols in a case that the subframe has the extended CP length. The mapping unit 214 may dispose two reference symbols at a location of a third OFDM symbol and a location of a fourth OFDM symbol respectively in a case that the DPUCCH uses the first DPUCCH format.

Furthermore, for example, the data transmission format information and the power control information or further at least one of the transmission priority information and the transmission stability indication information are transmitted in a case that the DPUCCH uses the second DPUCCH format (that is, the DPUCCH Format 2 or DPUCCH Format 2a above). In this case, OFDM modulation pre-coded by the DFT (Discrete Fourier Transform) is performed on data to be transmitted, data block coding is performed on the data first, and then the data is modulated by QPSK, frequency-domain averaging is performed on the data by the DFT before OFDM modulation, and the data is converted into OFDM symbols by the IFFT, and is then mapped.

Figure 6:
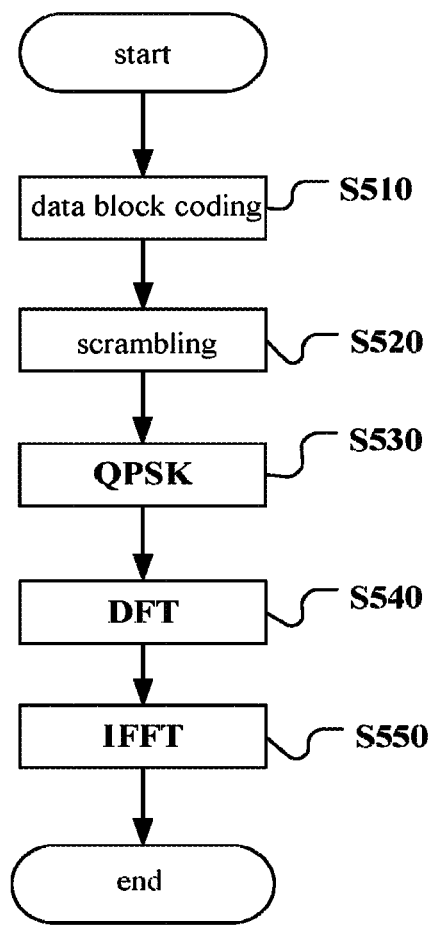
FIG. 6 is a flowchart showing a modulation and coding mode for control signaling according to another embodiment of the present disclosure.

FIG. 6 shows a flowchart of a modulation and coding mode when DPUCCH uses the second DPUCCH format according to another embodiment of the present disclosure. As shown in FIG. 6, the modulating unit 214 may perform a data block coding process S510, a scrambling process S520, a QPSK process S530, a DFT process S540 and an IFFT process S550 in sequence, OFDM symbols are obtained in this way. Here, the data block coding process, the scrambling process, the QPSK process, the DFT process and the IFFT process are well-known for those skilled in the art, hence, which are not described in detail in the present disclosure.

Figure 7:
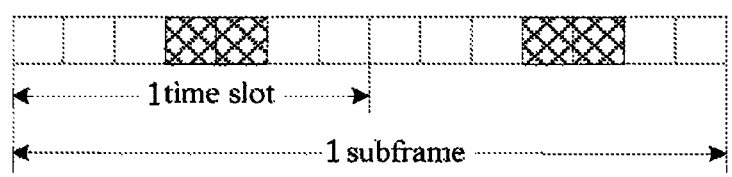
FIG. 7 is a schematic diagram showing a resource mapping mode for control signaling according to another embodiment of the present disclosure.

FIG. 7 shows an example of a resource mapping mode when DPUCCH uses the second DPUCCH format according to an embodiment of the present disclosure. In FIG. 7, similarly, a box having a grid represents the reference symbol, and a blank box represents the control symbol.

In the example as shown in FIG. 7, one time slot includes two reference symbols. One time slot includes seven OFDM symbols in a case that the subframe has a normal CP length. The mapping unit 214 may dispose two reference symbols at a location of a fourth OFDM symbol and a location of a fifth OFDM symbol respectively in a case that the DPUCCH uses the second DPUCCH format.

Similarly, one time slot only includes six OFDM symbols in a case that an extended CP length is required for the D2D communication. In this case, the last one OFDM symbol on each time slot having the normal CP length is removed by the mapping unit 214, and the symbol number and the mapping of the reference signals are unchanged.

Specifically, one time slot includes two reference symbols. One time slot includes six OFDM symbols in a case that the subframe has the extended CP length. The mapping unit 214 may dispose two reference symbols at a location of a fourth OFDM symbol and a location of a fifth OFDM symbol respectively in a case that the DPUCCH uses the second DPUCCH format.

Furthermore, for example, the data transmission format information, the power control information, the channel status report information and the HARQ information, or further at least one of the transmission priority information and the transmission stability indication information are transmitted in a case that the DPUCCH uses the third DPUCCH format (that is, the DPUCCH Format 3 or DPUCCH Format 3a above). In this case, the channel status report information may have multiple information bits. The OFDM modulation pre-coded by the DFT is performed on data to be transmitted, data block coding is performed on the data first, and then the data is modulated by QPSK, frequency-domain averaging is performed on the data by the DFT before OFDM modulation, and the data is converted into OFDM symbols by the IFFT, and then is mapped. That is, a modulation and coding mode when DPUCCH uses the third DPUCCH format may be the same as a modulation and coding mode when DPUCCH uses the second DPUCCH format.

Figure 8:
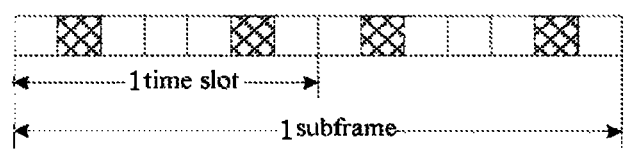
FIG. 8 is a schematic diagram showing a resource mapping mode for control signaling according to still another embodiment of the present disclosure.

FIG. 8 shows an example of a resource mapping mode when DPUCCH uses the third DPUCCH format according to an embodiment of the present disclosure. In FIG. 8, similarly, a box having a grid represents the reference symbol, and a blank box represents the control symbol.

In an example as shown in FIG. 8, one time slot includes two reference symbols. One time slot includes seven OFDM symbols in a case that the subframe has a normal CP length. The mapping unit 214 may dispose two reference symbols at a location of a second OFDM symbol and a location of a sixth OFDM symbol respectively in a case that the DPUCCH uses the third DPUCCH format.

In addition, One time slot only includes six OFDM symbols in a case that an extended CP length is required for the D2D communication. In this case, an OFDM symbol in the middle of the time slot having the normal CP length is removed by the mapping unit 214, and the symbol number and the mapping of the reference signals are unchanged.

Specifically, one time slot includes two reference symbols. One time slot includes six OFDM symbols in a case that the subframe has the extended CP length. The mapping unit 214 may dispose two reference symbols at a location of a second OFDM symbol and a location of a fifth OFDM symbol respectively in a case that the DPUCCH uses the third DPUCCH format.

It should be indicated that, the content transmitted by the DPUCCH and the format classification of the DPUCCH described above is different from a way considered in designing a PUCCH of a conventional user-to-base-station, the differences are described as follows.

First, in the conventional design for the uplink control signaling, the base station completely controls actions of the terminal, and has known which mode (a modulation and demodulation mode, the size of a transmission block) the uplink data is transmitted in before the data is transmitted, hence, the uplink control signaling does not need to carry related transmission information. However, in D2D peer-to-peer communication, the information must be agreed upon between communication equipments. The transmission priority information may be added considering that the D2D communication may be applied into a public security situation and may have a cluster head structure. Also, since the D2D has a feature of instant messaging, stability information may be added to raise flexibility of resource scheduling.

Second, formats of control signaling of the conventional user-to-base-station are mainly classified based on types of the transmitted control information. In the present disclosure, various scenarios of D2D communication should also be considered when classifying the formats of DPUCCH. The data may be transmitted in a broadcasting mode under a public security scenario. In the broadcasting mode, the HARQ information and the channel status information are not the control information transmitted necessarily (it can be considered that the control information transmitted in the broadcasting mode is a subset of control information in the point-to-point communication mode). In this case, the Format 2 or the Format 2a is suitable. In the point-to-point D2D communication, it is beneficial to improve the communication performance in a case that the HARQ information and the channel status information are added. Hence, the Format 1, the Format 1a and the Format 1b are suitable to only transmit the control-type information such as the HARQ information and the channel status information, and the Format 3 and the Format 3a are suitable to transmit control information for the subsequent data information, and for joint transmission for the HARQ information and the channel status information with the control information for the subsequent data information.

Third, when the OFDM symbols are mapped, since a DPUCCH format can be determined based on the location of the reference signals of the received subframe, thereby avoiding blind detection.

D2D communication in various scenarios uses a uniform format of the control signaling by the above design, thereby reducing difficulty of the implementation.

It should be described that, resource mapping modes as shown in FIG. 5, FIG. 7 and FIG. 8 are merely examples, the present disclosure is not limited to these specific resource mapping modes. The reference symbols may also be disposed at other locations on the time slot, so long as the DPUCCH formats can be distinguished.

A case that the transmitting unit of the UE directly transmits the control information to another UE using the DPUCCH is described above. Alternatively, the transmitting unit may also transmit the control information to another UE using a PUSCH. In this case, the base station also does not participate in transmission for the control information between D2D equipments.

Figure 9:
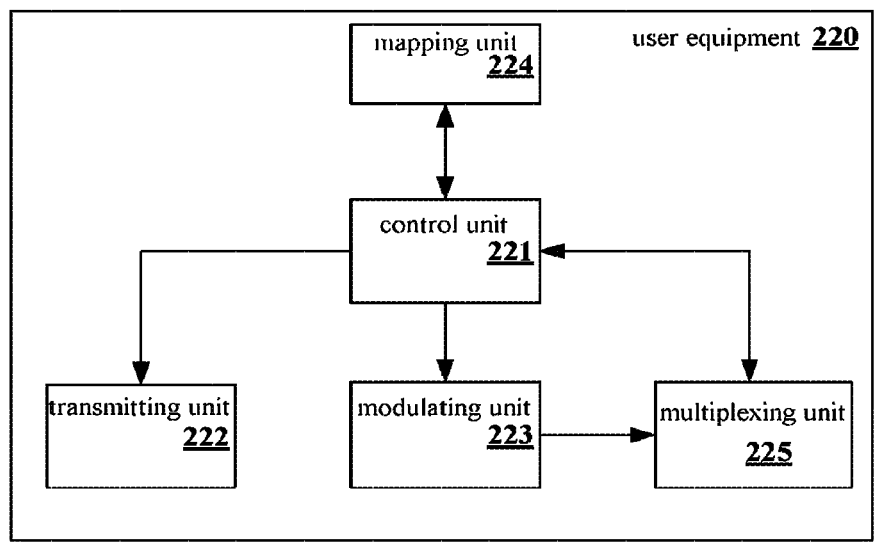
FIG. 9 is a block diagram showing a structure of a user equipment according to another embodiment of the present disclosure.

FIG. 9 shows a structure of a UE 220 according to another embodiment of the present disclosure. As shown in FIG. 9, the UE 220 may include a control unit 221, a transmitting unit 222, a modulating unit 223 and a multiplexing unit 225. The UE 220 may further include a mapping unit 224. The transmitting unit 222 as shown in FIG. 9 corresponds to the transmitting unit 212 as shown in FIG. 2. However, the transmitting unit 222 herein transmits control information and data information simultaneously.

Furthermore, the modulating unit 223 is controlled by the control unit 221 for modulating data transmission format information and power control information.

Thus, the multiplexing unit 225 is controlled by the control unit 221 for causing the data transmission format information and the power control information modulated by the modulating unit 223 to participate in multiplexing with the data information.

Preferably, the modulating unit 223 may further modulate at least one of transmission priority information and transmission stability indication information. In addition, the control unit 221 may cause the at least one of the transmission priority information and the transmission stability indication information modulated by the modulating unit 223 to incorporate into a bit stream multiplexed by the multiplexing unit 225 in a slotting manner.

It should be emphasized that, control information on a Scheduling Request is not necessary to be transmitted in a case that control information and data information of the conventional user-to-base-station are transmitted simultaneously. This is because that, a mode in which the control information and the data information are transmitted simultaneously occurs on the premise that respective physical resource has been allocated. The D2D communication may occur without being covered by a base station, in this case, it is necessary to notify an opposite equipment of physical resource dynamically allocated to the opposite party to transmit. Hence, related information on the data transmission format is transmitted.

Figure 10:
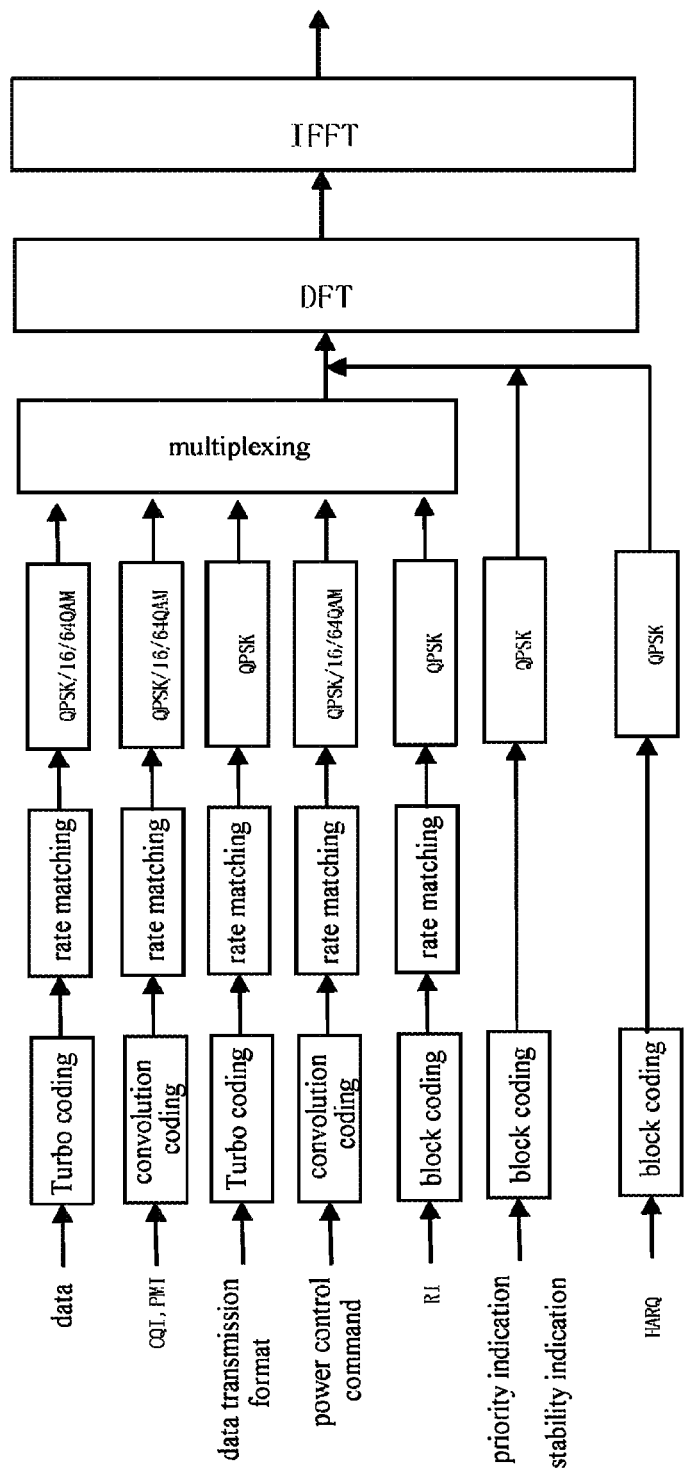
FIG. 10 is a flowchart showing a modulation and coding mode in a case that control information and data information are transmitted simultaneously according to an embodiment of the present disclosure.

FIG. 10 shows a flowchart of a modulation and coding mode in a case that control information and data information are transmitted simultaneously according to an embodiment of the present disclosure.

As shown in FIG. 10, a Turbo coding process, a rate matching process and a QPSK/16/64QAM (Quadrature Amplitude Modulation) process are performed on the data information in sequence.

A convolution coding process, the rate matching process and the QPSK/16/64 QAM process are performed for CQI (Channel Quality Indication) and PMI (Precoding Matrix Indicator) information in sequence.

The Turbo coding process, the rate matching process and a QPSK process are performed for the data transmission format information in sequence.

The convolution coding process, the rate matching process and the QPSK/16/64 QAM process are performed for the power control information in sequence.

A data block coding process, the rate matching process and the QPSK process are performed for RI (rank indication) information in sequence.

The data block coding process and the QPSK process are performed for the transmission priority information and the transmission stability indication information in sequence.

The data coding process and the QPSK process are also performed for the HARQ confirmation information in sequence.

Specifically, the modulating unit 223 may modulate the data transmission format information by performing the Turbo coding process, the rate matching process and the QPSK process in sequence. The multiplexing unit 225 may cause the data transmission format information modulated by the modulating unit 223 to participate in multiplexing with the data information.

Furthermore, the modulating unit 223 may further modulate the power control information by performing the convolution coding process, the rate matching process and the QPSK/16/64 QAM process in sequence. The multiplexing unit 225 may further cause the power control information modulated by the modulating unit 223 to participate in multiplexing with the data information.

In addition to the data transmission format information, the power control information and the data information, the CQI information, the PMI information and the RI information may also participate in multiplexing.

In addition, the modulating unit 223 may further module at least one of the transmission priority information and the transmission stability indication information by performing the data block coding process and the QPSK process in sequence. The control unit 221 may cause the at least one of the transmission priority information and the transmission stability indication information modulated by the modulating unit 223 to incorporate into a bit stream multiplexed by the multiplexing unit 225 in a slotting manner.

Furthermore, the HARQ confirmation information may also be added to the multiplexed bit stream in a slotting manner.

The DFT process and the IFFT process are performed on the multiplexed bit stream in sequence to obtain OFDM symbols.

The Turbo coding process, the rate matching process and the QPSK/16/64 QAM process described above are well-known for those skilled in the art, which are not described in detail in the present disclosure.

It should be described that, since the data transmission format information is important, QPSK modulation having a good robustness is used. QPSK coding may also be used for the transmission priority indication information and the transmission stability indication information to ensure performance. A power control command (the power control information) may use a same modulation mode as the data information.

In addition, the transmission priority indication information and the transmission stability indication information are control information which is optional based on the priority and the stability of data to be transmitted, and the opposite equipment does not know whether the two bits are transmitted. A data rate of the transmitting terminal does not match with a data rate of the receiving terminal in a case that the two indication information participate in rate matching with other data. Hence, processing for the two indication information is the same as the processing for the HARQ confirmation information, that is, the two indication information incorporate into a bit stream coded by other information in a slotting manner.

According to an embodiment of the present disclosure, the mapping unit 224 is controlled by the control unit 221 for mapping the control information onto subframes. Herein, the mapping unit 224 may dispose the data transmission format information at a location close to that of reference symbols.

FIG. 11 shows a resource mapping mode in a case that control information and data information are transmitted simultaneously according to an embodiment of the present disclosure. As shown in FIG. 11, a horizontal axis represents a subframe of 1 ms, a vertical axis represents a DFTS-OFDM (Discrete Fourier Transform Spread OFDM) symbol. A box labeled as a number "1" represents a reference signal, a box labeled as a number "2" represents the data transmission format information, a box labeled as a number "3" represents the HARQ confirmation information, a box labeled as a number "4" represents the power control information, a box labeled as a number "5" represents the RI information, a box labeled as a number "6" represents the transmission priority information and the transmission stability indication information, a box labeled as a number "7" represents the CQI information and PMI information, and the rest of boxes is user data. A general design principle is to dispose important information such as the HARQ confirmation information, the RI information and the data transmission format information to be close to the reference symbols to ensure the accuracy of demodulation.

In addition, in broadcasting communication, only the HARQ information and the channel status information are removed, and a modulation and coding mode and a resource mapping mode for other information may be unchanged.

An example in which the D2D communication is controlled by a UE is described above, for example, wherein the base station does not participate in the D2D communication between UEs. In a case that at least one of the UEs (a UE directly participating in the D2D communication or a cluster head for providing control for D2D communication performed between other UEs) related to the D2D communication is located within a coverage area of the base station, specifically, for example, in a case that the UEs for the D2D communication are all located within the coverage area of the base station (as shown by the curve a in FIG. 1), the base station may also participate in the D2D communication between the UEs.

According to an embodiment of the present disclosure, the wireless communication system may further include a base station, and the transmitting unit of the UE may transmit a D2D SR (Scheduling Request) to the base station using a PUCCH.

A resource for communication between terminals may be allocated by the base station in a semi-static way or in a dynamic way, and an allocation way may also be based on a cell or a terminal. In a case that the allocation way is based on the cell or is a semi-static way, all terminals which support the D2D communication are notified of the allocated resource by high-layer signaling before communication. In this case, the resource allocation is performed without assistance from control signaling in the physical layer. Apparently, the resource allocation mentioned above has no flexibility, so that the base station does not effectively use the resource based on real-time resource usage and interference scenario. However, in a case that resource allocation scheme is changed frequently by the high-layer signaling in order to improve the flexibility of resource usage, a load of RRC (Radio Resource Control) signaling may be increased. Therefore, a dynamic resource allocation way based on the terminal has apparent advantage. In order to support such resource allocation way, enhancement for the existing PUCCH is not complicated. The future network needs to support concurrent communication of user-to-base-station communication and user-to-user communication. In order to implement the concurrent communication of the two communication modes, resources thereof should be allocated simultaneously, and mutual interference should be avoided in a process of allocating the resources. Hence, bit information is added, which is referred to as a D2D Scheduling Request (D2D SR) to identify whether a D2D communication resource is required to be allocated. Next, it is required to determine which PUCCH format the bit information is added to.

In the existing standard, the PUCCH may have at least one of the following formats:

a first PUCCH format for transmitting the HARQ confirmation information or the SR;

a second PUCCH format for transmitting the channel status information; and a third PUCCH format for transmitting the HARQ confirmation information, the SR, or the channel status information.

It should be described that, the first PUCCH format is used for transmitting the HARQ confirmation information or the Scheduling Request, but the Scheduling Request is implemented by energy detection and is not suitable to be a carrier for loading the D2D SR.

The second PUCCH is mainly used for transmitting the channel status information, hence, in order to raise backward compatibility, the second PUCCH is not suitable to load the D2D SR, either.

The third PUCCH format is used for transmitting the HARQ confirmation information, the Scheduling Request and the channel status information. Data transmission amount will not be increased apparently even if bit of the D2D SR is added, since multi-bits transmission are supported by the third PUCCH format for carrier aggregation. Hence, it is preferable in the present disclosure that the bit of the D2D SR is added using the third PUCCH format, to transmit a resource allocation request for performing the D2D communication to the base station. The subsequent processes such as a coding process, a scrambling process, a modulation process is the same as the existing standard, which is not described repeatedly. However, the above discussion is a preferred solution set forth based on the conventional technology, which is not intended to limit the present disclosure. It should be understood that, with the development of technology, other PUCCH formats may occur or the existing three PUCCH formats are changed. Based on the conception of the present disclosure, the bit of the D2D SR may also be added to other PUCCH formats, thereby realizing a technical effect indicating that a communication resource requested to the base station is used for the D2D communication.

As described above, for example, the control unit of the UE may represent the D2D SR by adding the bit to the third PUCCH format. Specifically, the control unit of the UE may represent the D2D SR by adding one bit to the third PUCCH format. In this case, the bit indicates that a resource requested to be allocate is a resource for the D2D. The number of equipments participating in the D2D communication may be one or more since an equipment, such as an opposite equipment, participating in the D2D communication is not indicated clearly. Accordingly, resource allocated by the base station may be a resource pool from which the UE may select. It should be noted that, an UE which transmits the D2D SR to the base station may be a party which directly participates in the D2D communication, or a UE only provides control for D2D communication performed between other UEs, such as a cluster head. In the latter case, the UE such as the cluster head allocates a resource to the corresponding UE via the DPUCCH described above after acquiring the D2D resource allocated by the base station.

Alternatively, the control unit may also represent the D2D SR by redefining a bit representing the SR in the third PUCCH format. Alternatively, the control unit may also represent the D2D SR by redefining a bit representing the SR in the first PUCCH format and adding modulation and demodulation for the PUCCH having the first PUCCH format. In this case, for example, a Scheduling Request is used for the D2D in a case that the bit is 1; a Scheduling Request is used for device-to-base-station in a case that the bit is 0; and there is no Scheduling Request in a case that the bit does not exist. In addition, the transmitting unit needs to transmit the PUCCH twice in a case that the Scheduling Request for the D2D and the Scheduling Request for the device-to-base-station exist simultaneously.

In addition, the control unit of the UE may represent another UE which participates in the D2D transmission by further adding an RNTI (Radio Network Temporary Identifier) to the PUCCH.

Specifically, for example, a RNTI identifier of 16 bits may be added into the third PUCCH format, to specify a D2D opposite equipment with which it is hoped to communicate. The specification may be used to specify unique D2D equipment with which it is hoped to communicate. A standard for selecting the D2D equipment may be information such as user preference, a distance, data information stored by the opposite equipment or terminal energy consumption. The information is especially applicable to specify the opposite equipment in a case that a range of the D2D communication is limited or in a case that communication is performed with the cluster head (if any) in D2D communication. Also, after receiving the information, the base station associates an identifier of uplink scheduling grant for the PDCCH (Physical Downlink Control Channel) with the received RNTI information, to indicate a receiving terminal for the uplink scheduling grant.

Figure 12:
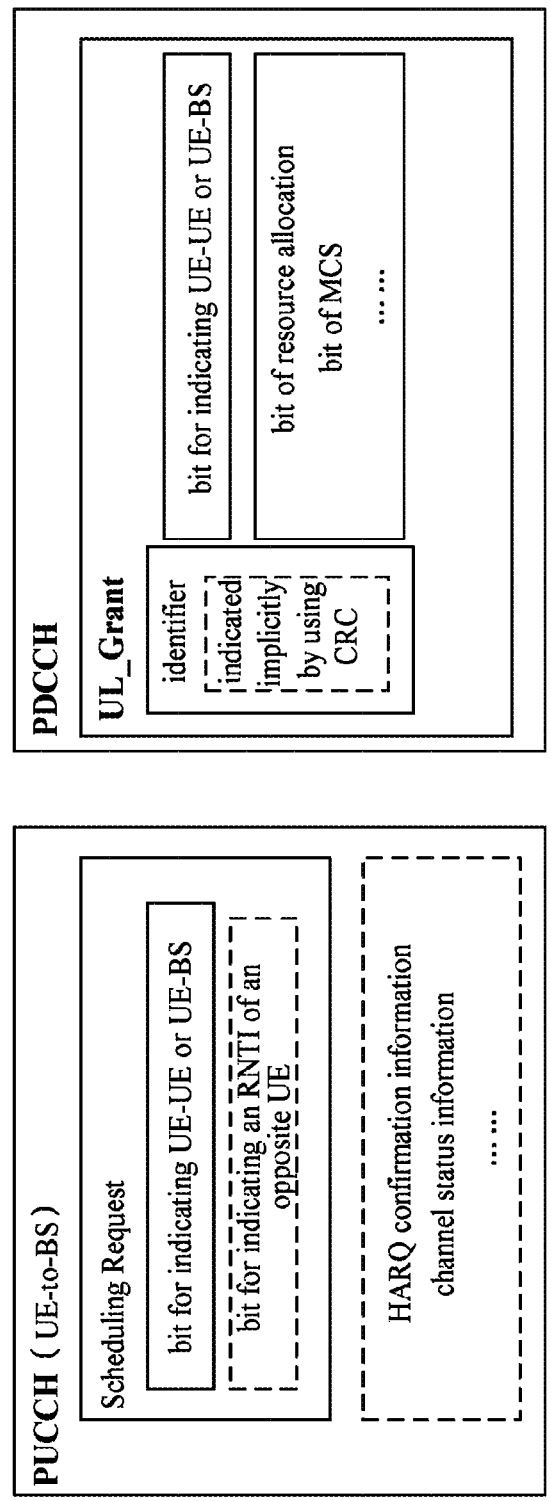
FIG. 12 is a schematic diagram showing an example of content of a PUCCH from a UE to a BS (base station) and content of a corresponding PDCCH.

FIG. 12 shows an example of content of a PUCCH from a UE to a BS (base station) and content of a corresponding PDCCH. As shown in FIG. 12, "a bit for indicating UE-UE or UE-BS" in the PDCCH may correspond to "a bit for indicating UE-UE or UE-BS" in a Scheduling Request in the PUCCH, and an identifier "indicated implicitly by using CRC (Cyclic Redundancy Check)" in UL-Grant in the PDCCH may include "a bit for indicating an RNTI of an opposite UE" in a Scheduling Request in the PUCCH.

It should be described that, an identifier of the uplink scheduling grant is not necessarily transmitted to a terminal by the base station explicitly, or may be included in CRC calculation implicitly. In a case that a terminal with which it is hoped to communicate is specified in the Scheduling Request, the base station may transmit the uplink transmission grant to a corresponding specified communication terminal in addition to transmitting the uplink scheduling grant to a terminal transmitting a request, identifiers in the grants are all associated with the RNTI of the receiving terminal by CRC implicitly.

According to the embodiment of the present disclosure, the CRC may be scrambled by the RNTI of the UE on the receiving end. For example, it is provided that a first user equipment UE1 wants to perform D2D communication with a second user equipment UE2 and transmits an SR to the base station. In this case, the base station transmits an uplink scheduling grant to the UE1 after using the RNTI of the UE1 to scramble the CRC, and the base station transmits an uplink scheduling grant to the UE2 after using the RNTI of the UE2 to scramble the CRC.

Furthermore, according to the embodiment of the present disclosure, two RNTIs may be used to scramble. For example, it is provided that the UE1 wants to perform D2D communication with multiple user equipments UEi+1 (i=1, 2, 3) and transmits an SR (the SR indicates a list of a single UE or multiple UEs, which is an SR list) to the base station. In this case, the base station transmits an uplink grant to the UE1 after using an RNTI of the UE1 and an RNTI of the UEi+1 to scramble the CRC, and the base station transmits an uplink scheduling grant to the UEi+1 after using the RNTI of the UE1 and the RNTI of the UEi+1 to scramble the CRC.

It is provided that the UEi+1 has recorded RNTIs (a potential RNTI list) of all the UEs which want to perform D2D communication by a D2D discovering signal. In this case, when the uplink scheduling grant is received by the UE1, the UE1 may try every possible combination of a RNTI in the SR list and a RNTI of UE1 until the CRC is descrambled successfully. Meanwhile, when the uplink scheduling grant is received by the UEi+1, the UEi+1 may try every possible combination of a RNTI of any UE in the potential RNTI list and a RNTI of the UEi+1 until the CRC is descrambled successfully.

In addition, the control unit of the UE may further represent an opposite equipment participating in the D2D by adding other information such as a bit pattern to the PUCCH.

Specifically, in a case that the base station and the UE agree upon the RNTI, an object which is applied for using the D2D resource may be indicated by information which occupies less resource than the RNTI. For example, the bit pattern is used, in which, a bit 1 indicates that an opposite equipment associated with the bit is applied for the D2D resource, and a bit 0 indicates that an opposite equipment associated with the bit does not apply for the D2D resource. For example, it is provided that the UE hopes to perform D2D communication with two opposite equipments. In this case, there are three user equipments a, b and c which support the D2D communication in the communication network. In this case, an SR bit and a bit pattern 011 transmitted by the UE indicate that two opposite equipments b and c are applied for the D2D communication resource.

As described above, the D2D SR is especially suitable for a dynamic resource scheduling mode. It can be extended that, a bit of the D2D SR may also be used for a semi-static scheduling mode. In the semi-static scheduling mode, the base station generally changes the resource configuration by RRC signaling actively in a case that the resource configuration mode is required to be changed. After the D2D SR is added, the terminal may evaluate communication quality based on usage of the configured resource, and the terminal actively notifies the base station of reconfiguring the semi-static resource by the D2D SR in a case that the communication quality does not meet a requirement. Thus, the flexibility and the performance of the semi-static scheduling mode are enhanced. Meanwhile, the D2D SR may also be extended into a user-to-cluster-head structure.

Figure 13:
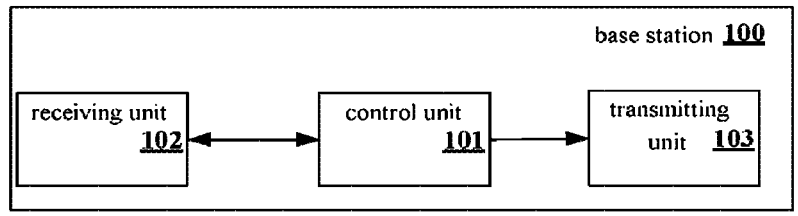
FIG. 13 is a block diagram showing a structure of a base station according to an embodiment of the present disclosure.

FIG. 13 shows a structure of a base station 100 according to an embodiment of the present disclosure. As shown in FIG. 13, the base station 100 may include a control unit 101, a receiving unit 102 and a transmitting unit 103.

The receiving unit 102 is controlled by the control unit 101 for receiving a signal from at least one of a first UE and a second UE (such as the UE 200 and the UE 300 in FIG. 1).

The transmitting unit 103 is controlled by the control unit 101 for transmitting uplink scheduling grant information to the first UE using a PDCCH when the receiving unit 102 receives a D2D SR for performing D2D communication between the first UE and the second UE, for example, from the first UE. Herein, the control unit 101 makes a representation of whether a resource is allocated for D2D or device-to-base-station by adding a bit (such as one bit) to the uplink scheduling grant information. For example, the uplink scheduling grant information may have a same or similar format as DCI (Downlink Control Information) format 0, DCI format 4 in the 3GPP standard, which may be collectively referred to as UL Grant information.

Specifically, after the D2D SR is received by the receiving unit 102 of the base station 100, the base station 100 allocates a subsequent transmission resource based on current resource usage, resource configuration of a requesting terminal and resource configuration of peripheral equipments, the allocated resource is indicated by the uplink scheduling grant on the downlink PDCCH of the base station. One bit identifier (D2D Flag) is added in the uplink scheduling grant to identify whether the resource is used for user-to-base-station communication or user-to-user communication.

According to the embodiment of the present disclosure, the control unit 101 may indicate a second UE participating in the D2D transmission by associating an identifier of the uplink scheduling grant information with an RNTI in a case that a PUCCH signal transmitted by the first UE includes the RNTI.

Figure 14:
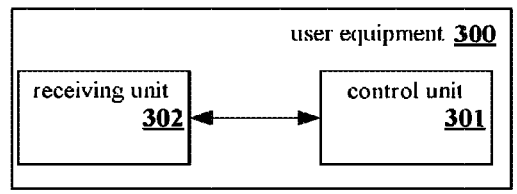
FIG. 14 is a block diagram showing a structure of a user equipment according to still another embodiment of the present disclosure.

FIG. 14 shows a structure of an UE 300 according still another embodiment of the present disclosure. As shown in FIG. 14, the UE 300 includes a control unit 301 and a receiving unit 302.

The receiving unit 302 is controlled by the control unit 301 for receiving control information transmitted by another UE. Herein, the control information may include at least one of data transmission format information and power control information.

The control unit 301 may perform data transmission format setting based on the data transmission format information in the control information received by the receiving unit 302. For example, the control unit 301 may perform resource block allocation for PUSCH transmission based on transmission block allocation in the data transmission format information. The control unit 301 may determine a modulation and coding format based on an MCS in the data transmission format information. The control unit 301 may determine whether data is new data or retransmission data based on new data indication in the data transmission format information. The control unit 301 may calculate a frequency hopping mapping from a virtual resource block onto a physical resource block based on a cell ID and a cell bandwidth in the data transmission format information.

Furthermore, the control unit 301 may perform power control setting based on the power control information in control information received by the receiving unit 302. Specifically, the control unit 301 may determine a power control mode of the user equipment 300 based on power control command indication in the power control information.

Data information to be transmitted by the UE 300 is sent to a corresponding opposite equipment of the D2D communication after being processed by the control unit 301 described above.

According to an embodiment of the present disclosure, the control unit 301 may determine a format of PUCCH (that is DPUCCH) for transmitting the control information based on information on a location of a reference symbol on each time slot.

Taking FIG. 5, FIG. 7 and FIG. 8 described above as an example, in a case of a normal CP length, two reference symbols are disposed at a location of the third OFDM symbol and a location of the fourth OFDM symbol respectively (as shown in FIG. 5) in a case that the DPUCCH uses the first DPUCCH format; two reference symbols are disposed at a location of the fourth OFDM symbol and a location of the fifth OFDM symbol respectively (as shown in FIG. 7) in a case that the DPUCCH uses the second DPUCCH format; and two reference symbols are disposed at a location of the second OFDM symbol and a location of the sixth OFDM symbol respectively (as shown in FIG. 8) in a case that the DPUCCH uses the third DPUCCH format.

Thus, in a case of a normal CP length, the control unit 301 determines the first DPUCCH format is used in a case of finding that two reference symbols are disposed at the location of the third OFDM symbol and the location of the fourth OFDM symbol respectively; the control unit 301 determines that the second DPUCCH format is used in a case of finding that two reference symbols are disposed at the location of the fourth OFDM symbol and the location the fifth OFDM symbol respectively; or the control unit 301 determines that the third DPUCCH format is used in a case of finding that two reference symbols are disposed at the location the second OFDM symbol and the location of the sixth OFDM symbol respectively.

Furthermore, in a case of the extended CP length, two reference symbols are disposed at a location of the third OFDM symbol and a location of the fourth OFDM symbol respectively in a case that the DPUCCH uses the first DPUCCH format; two reference symbols are disposed at a location of the fourth OFDM symbol and a location of the fifth OFDM symbol respectively in a case that the DPUCCH uses the second DPUCCH format; and two reference symbols are disposed at a location of the second OFDM symbol and a location of the fifth OFDM symbol respectively in a case that the DPUCCH uses the third DPUCCH format.

Thus, in a case of the extended CP length, the control unit 301 determines that the first DPUCCH format is used in a case of finding that two reference symbols are disposed at the location of the third OFDM symbol and the location of the fourth OFDM symbol respectively; the control unit 301 determines that the second DPUCCH format is used in a case of finding that two reference symbols are disposed at the location of the fourth OFDM symbol and the location of the fifth OFDM symbol respectively; and the control unit 301 determines that the third DPUCCH format is used in a case of finding that two reference symbols are disposed at the location of the second OFDM symbol and the location of the fifth OFDM symbol respectively.

As mentioned above, resource mapping modes as shown in FIG. 5, FIG. 7 and FIG. 8 are merely examples, the present disclosure is not limited to there specific resource mapping modes. The reference symbols may also be disposed at other location on the time slot so long as the DPUCCH formats can be distinguished. In any case, the control unit 301 can determine a format of the PUCCH for transmitting the control information based on information on a location of the reference symbols on each time slot once the resource mapping mode is determined.

A method for performing D2D communication in a wireless communication system is described next. The wireless communication system at least includes a first UE and a second UE. The method may include: transmitting, by the first UE, control information to the second UE via an uplink channel, wherein the control information includes at least one of data transmission format information and power control information.

Preferably, the control information may further include at least one of channel status report information, HARQ confirmation information, transmission priority information and transmission stability indication information.

Preferably, the first UE may transmit the control information to the second UE using a DPUCCH.

Preferably, the DPUCCH may have at least one of the following formats:

a first DPUCCH format for transmitting at least one of the channel status report information and the HARQ confirmation information;

a second DPUCCH format for transmitting the data transmission format information and the power control information, or for transmitting the data transmission format information and the power control information, and at least one of the transmission priority information and the transmission stability indication information; and a third DPUCCH format for transmitting the data transmission format information, the power control information, the channel status report information and the HARQ confirmation information, or for transmitting the data transmission format information, the power control information, the channel status report information and the HARQ confirmation information, and at least one of the transmission priority information and the transmission stability indication information.

Preferably, the method may further include modulating the DPUCCH into OFDM symbols, the OFDM symbols are mapped on time slots in a subframe, and a locations of reference symbols on the time slot are disposed depending on a format of the DPUCCH, wherein various DPUCCH formats have various locations of the reference symbols.

Preferably, the first UE may transmit the control information to the second UE using a PUCCH.

Preferably, the data transmission format information and the power control information may be modulated, and the modulated data transmission format information is caused to participate in multiplexing with data information.

Preferably, at least one of the transmission priority information and the transmission stability indication information may be modulated, and at least one of the modulated transmission priority information and the modulated transmission stability indication information is caused to incorporate into a multiplexed bit stream in a slotting manner.

Preferably, the data transmission format information may be disposed at a location which is close to that of a reference symbol in a case that the control information is mapped onto a subframe.

Preferably, the wireless communication system may further include a base station, and the first UE may transmit a D2D SR to the base station with a PUCCH.

Preferably, the PUCCH may have at least one of the following formats:

a first PUCCH format for transmitting HARQ confirmation information or SR;

a second PUCCH format for transmitting channel status information; and a third PUCCH format for transmitting the HARQ confirmation information, the SR, and the channel status information.

Specifically, the D2D SR is represented by adding a bit to the third PUCCH format, or the D2D SR is represented by redefining a bit representing the SR in the third PUCCH format, alternatively, the D2D SR is represented by redefining a bit representing the SR in the first PUCCH format and adding modulation and demodulation for the PUCCH with the first PUCCH format.

Preferably, the base station transmits uplink scheduling grant information to the first UE with a PDCCH when receiving the D2D SR, specifically, the base station makes a representation of whether a resource is allocated for the D2D or device-to-base-station by adding a bit to the uplink scheduling grant information.

Preferably, an UE participating in the D2D transmission may be represented by adding an RNTI to the PUCCH.

Preferably, the base station may transmit uplink scheduling grant information to the first UE with the PDCCH when receiving the D2D SR, where the base station makes a representation of whether the resource is allocated for the D2D or device-to-base-station by adding a bit to the uplink scheduling grant information, and the base station indicates an UE participating in the D2D transmission by associating an identifier of the uplink scheduling grant information with the RNTI.

Various embodiments of the steps described above of the method for performing the D2D communication in the wireless communication system according to the embodiments of the present disclosure are described in detail above, which are not described repeatedly here.

An electronic device including a processing circuit may further be provided according to the embodiments of the present disclosure. The processing circuit is configured to control control information transmitted via an uplink channel, and the control information includes at least one of data transmission format information and power control information.

An electronic device including a processing circuit may further be provided according to the embodiments of the present disclosure. The processing circuit is configured to control uplink scheduling grant information transmitted with a PDCCH, it is indicated whether a resource is allocated for device-to-device or device-to-base-station by adding a bit to the uplink scheduling grant information.

An electronic device including a processing circuit may further be provided according to the embodiments of the present disclosure. The processing circuit is configured to control receiving for control information transmitted by a user equipment, specifically the control information includes at least one of data transmission format information and power control information.

An electronic device at a base station side applicable to a wireless communication system including a first user equipment, a second user equipment and the base station may further be provided according to the embodiments of the present disclosure, the electronic device includes: a processing circuit configured to generate uplink scheduling grant information for D2D communication to be performed between the first user equipment and the second user equipment based on a D2D Scheduling Request SR for the D2D communication from the first user equipment; and map the uplink scheduling grant information onto a Physical Downlink Control Channel PDCCH to indicate a resource for the first user equipment to perform the D2D communication.

Preferably, the processing circuit may be further configured to associate the uplink scheduling grant information with an RNTI of the first user equipment and an RNTI of the second user equipment, to indicate that the uplink scheduling grant information is used for the D2D communication to be performed between the first user equipment and the second user equipment.

Preferably, the processing circuit may be configured to scramble a Cyclic Redundancy Check CRC of the uplink scheduling grant information by using the RNTI of the first user equipment and the RNTI of the second user equipment, to perform the association.

Preferably, the processing circuit may be further configured to determine transmission resource allocation based on current resource usage and resource configuration for the first user equipment, to generate the uplink scheduling grant information for the D2D communication.

Preferably, the resource for the D2D communication may include a resource in a resource pool.

Preferably, the electronic device may be a base station, and the electronic device may further include a transmitting unit configured to receive the D2D Scheduling Request SR, and transmit the uplink scheduling grant information to the first user equipment by the Physical Downlink Control Channel PDCCH.

An electronic device at a user equipment side applicable to a wireless communication system including the user equipment, another user equipment and a base station may further be provided according to the embodiments of the present disclosure, the electronic device includes: a processing circuit configured to generate a D2D Scheduling Request SR for requesting performing D2D communication between the user equipment and the another user equipment to the base station; and map the D2D Scheduling Request SR onto a Physical Uplink Control Channel PUCCH, to indicate resource for the D2D communication requested by the user equipment.

Preferably, the processing circuit may be further configured to acquire a Physical Downlink Control Channel PDCCH from the base station; and descramble a Cyclic Redundancy Check CRC of uplink scheduling grant information carried on the Physical Downlink Control Channel PDCCH, and determine the uplink scheduling grant information for the D2D communication to be performed between the user equipment and the another user equipment to acquire resource for the D2D communication.

Preferably, the processing circuit may further be configured to descramble the Cyclic Redundancy Check CRC by using an RNTI of the user equipment and an RNTI of the another user equipment.

Preferably, the resource for the D2D communication may include a resource in a resource pool.

Preferably, the electronic device may be the user equipment, the electronic device may further include a transmitting unit configured to transmit the D2D Scheduling Request SR to the base station by the Physical Uplink Control Channel PUCCH.

It should know that, the electronic device described above may further perform other technical solutions according to the present disclosure as described above, which are not described here any more for brevity.

Apparently, respective operating processes of the method for performing D2D communication in a wireless communication system according to the present disclosure can be implemented in a manner of a computer executable program stored on a machine-readable storage medium.

And, the object of the present disclosure can be implemented in a manner that the storage medium on which the computer executable program above is carried is provided directly or indirectly to a system or apparatus, a computer or a Central Processing Unit (CPU) of which reads out and executes the computer executable program. Here, the implementation of the present disclosure is not limited to a program as long as the system or apparatus has a function to execute the program, and the program can be in arbitrary forms such as an objective program, a program executed by an interpreter, a script program provided to an operating system, etc.

The machine-readable storage medium mentioned above includes, but is not limited to, various memories and storage devices, a semiconductor device, a disk unit such as an optic disk, a magnetic disk and a magneto-optic disk, and other medium suitable for storing information.

Additionally, the present disclosure can also be implemented by connecting to a corresponding web site on the Internet through a computer, downloading and installing the computer executable program according to the present disclosure into the computer, and then executing the program.

Figure 15:
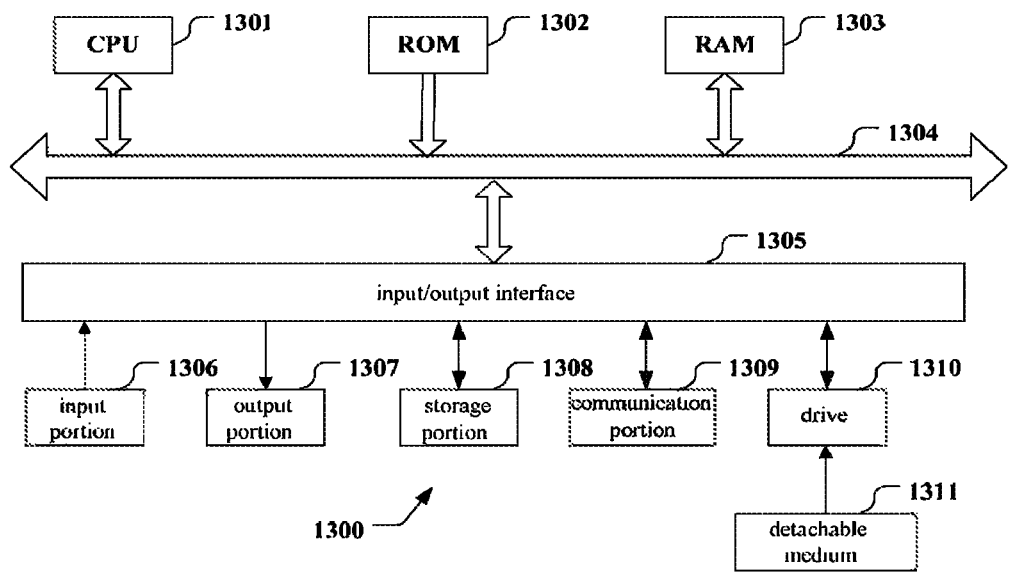
FIG. 15 is a block diagram showing an exemplary structure of a general-purpose personal computer for implementing a method for performing D2D communication in a wireless communication system according to an embodiment of the present disclosure.

FIG. 15 is a block diagram illustrating an exemplary structure of a general-purpose personal computer on which the method for performing D2D communication in a wireless communication system according to the embodiments of the present disclosure can be implemented.

As shown in FIG. 15, a CPU 1301 executes various processing according to a program stored in a Read Only Memory (ROM) 1302 or a program loaded to a Random Access Memory (RAM) 1303 from a storage device 1308. In the RAM 1303, if necessary, data required for the CPU 1301 in executing various processing and the like is also stored. The CPU 1301, the ROM 1302 and the RAM 1303 are connected to each other via a bus 1304. An input/output interface 1305 is also connected to the bus 1304.

The following components are connected to the input/output interface 1305: an input device 1306 including a keyboard, a mouse and the like, an output device 1307 including a display such as a Cathode Ray Tube (CRT) and a Liquid Crystal Display (LCD), a speaker and the like, the storage device 1308 including a hard disk and the like, and a communication device 1309 including a network interface card such as a LAN card, a modem and the like. The communication device 1309 performs communication processing via a network such as the Internet. If necessary, a drive 1310 may also be connected to the input/output interface 1305. A removable medium 1311 such as a magnetic disk, an optical disk, a magneto-optical disk, a semiconductor memory and the like is mounted on the drive 1310 as necessary such that a computer program read out therefrom is installed in the storage device 1308.

If the series of processing above is implemented in software, a program constituting the software is installed from the network such as the Internet or the storage medium such as the removable medium 1311.

It is understood by those skilled in the art that the storage medium is not limited to the removable medium 1311 shown in FIG. 15 in which the program is stored and which is distributed separately from the device so as to provide the program to the user. Examples of the removable medium 1311 include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM 1302, the hard disk contained in the storage device 1308 or the like. Herein, the program is stored in the storage medium, and the storage medium is distributed to the user together with the device containing the storage medium.

As described above, physical layer control signaling for supporting D2D communication is designed in the present disclosure, physical layer channels are respectively designed based on whether control information and user data are transmitted simultaneously. In a case that the control information and the user data are transmitted separately, a physical layer uplink control channel for user-to-base-station and a physical layer uplink control channel for user-to-user are designed, control information to be transmitted and a modulation and coding format are defined based on characteristics of D2D communication, and mapping between the control information and physical transmission resource on the channel is defined. In a case that the control information and the user data are transmitted simultaneously, a mode of transmitting the control information and the user data for the D2D on a PUSCH simultaneously is designed, and a modulation and coding mode and a resource mapping mode for the D2D are defined.

The communication efficiency between D2D equipments can be improved based on the above-described design according to the present disclosure, thereby enhancing the performance of data transmission.

In the system and method of the present disclosure, it is obvious that respective components or steps can be decomposed and/or recombined. Such decomposition and/or recombination should be considered as an equivalent solution of the present disclosure. And, the steps performing a series of processing above can be performed in the describing order naturally, but this is not necessary. Some steps can be performed concurrently or independently with one another.

Although the embodiments of the present disclosure have been described in detail in combination with the drawings above, it should be understood that, the embodiments described above are only used to explain the present disclosure and is not constructed as the limitation to the present disclosure. For those skilled in the art, various modification and alternation can be made to the above embodiments without departing from the essential and scope of the present disclosure. Therefore, the scope of the present disclosure is only defined by the appended claims and the equivalents thereof.

The invention claimed is:

1. A user equipment for performing device-to-device (D2D) communication in a wireless communication system including at least the user equipment and another user equipment, the user equipment comprising:
   circuitry and a transmitter,
   the circuitry configured to control the transmitter to transmit control information to the another user equipment via a physical channel,
   wherein the control information includes
      data transmission format information, the data transmission format information includes
         information on a Modulation and Coding Scheme (MCS) indicate a modulation and coding format, and
      the control information has
         a plurality of formats that indicate different formats of the plurality of formats correspond to different arrangement of a reference symbol in a transmission subframe;
   wherein the user equipment includes a user interface, and the circuitry is further configured to determine the control information to be transmitted by the transmitter of the user equipment directly to the another user equipment, wherein determining the control information includes determining the data transmission format including determining the MCS, and includes determining an arrangement of the reference symbol in the transmission subframe.

2. The user equipment according to claim 1, wherein the plurality of formats of control information includes a first format, and the first format includes transmission priority information, and the transmission priority information is applied to a current D2D communication scenario.

3. The user equipment according to claim 2, wherein the plurality of formats of control information includes a second format, and the second format does not include the transmission priority information.

4. The user equipment according to claim 3, wherein a highest priority indicated by the transmission priority information corresponds to a public security scenario.

5. The user equipment according to claim 2, wherein the transmitter is controlled by the circuitry to transmit the control information to the another user equipment with a Physical Uplink Shared Channel (PUSCH).

6. The user equipment according to claim 5, further comprising:
   a modulator configured to modulate the data transmission format information; and
   a multiplexer configured to multiplex the data transmission format information modulated by the modulator with the data information.

7. The user equipment according to claim 6, wherein
   the modulator is further configured to modulate the transmission priority information, and
   the circuitry is further configured to cause the transmission priority information modulated by the modulator to be incorporated into a bit stream multiplexed by the multiplexer in a slotting manner.

8. The user equipment according to claim 5, wherein the circuitry is further configured to:
   map the control information onto a subframe, and
   position the data transmission format information adjacent to the reference symbols.

9. The user equipment according to claim 1, wherein the wireless communication system further includes a base station, and the transmitter is configured to transmit a D2D Scheduling Request (SR) to the base station with a Physical Uplink Control Channel (PUCCH).

10. The user equipment according to claim 9, wherein the PUCCH has at least one format of:
   a first PUCCH format for transmission of a Hybrid Automatic Repeat Request (HARQ) confirmation information, or a Scheduling Request (SR);
   a second PUCCH format for transmission of channel status information; and
   a third PUCCH format for transmission of the HARQ confirmation information, the SR, or the channel status information, wherein
   the circuitry represents the D2D SR by adding a bit to the third PUCCH format, by redefining a bit representing the SR in the third PUCCH format, or by redefining a bit representing the SR in the first PUCCH format and adding modulation and demodulation for the PUCCH with the first PUCCH format.

11. The user equipment according to claim 10, wherein the circuitry is configured to represent the another user equipment participating in the D2D transmission by adding a Radio Network Temporary Identifier (RNTI) to the PUCCH.

12. A user equipment for performing device-to-device (D2D) communication in a wireless communication system including at least the user equipment and another user equipment, the user equipment comprising:
   a transmitter;

circuitry configured to control the transmitter to transmit control information to the another user equipment via a physical channel, wherein the control information includes
    data transmission format information, the data transmission format information includes
        information on a Modulation and Coding Scheme (MCS) indicate a modulation and coding format, and
    the control information has a plurality of formats that indicate different formats of the plurality of formats correspond to different arrangement of a reference symbol in a transmission subframe; and
a receiver controlled by the circuitry to receive control information transmitted by the another user equipment;
wherein the user equipment includes a user interface, and the circuitry is further configured to determine the control information to be transmitted by the transmitter of the user equipment directly to the another user equipment, wherein determining the control information includes determining the data transmission format including determining the MCS, and includes determining an arrangement of the reference symbol in the transmission subframe.

13. The user equipment according to claim 12, wherein the plurality of formats of control information includes a first format, and the first format includes transmission priority information, and the transmission priority information is applied to a current D2D communication scenario.

14. A method for performing device-to-device (D2D) communication in a wireless communication system including at least a first user equipment and a second user equipment, the method comprising:
    transmitting, by the first user equipment, control information to the second user equipment via a physical channel, wherein
        the control information includes data transmission format information, the data transmission format information includes
            information on a Modulation and Coding Scheme (MCS) indicating a modulation and coding format, and
        the control information has a plurality of formats for indicating different formats of the plurality of formats correspond to different arrangement of a reference symbol in a transmission subframe; and
    determining, by the first user equipment including a user interface, the control information to be transmitted by the transmitter of the first user equipment directly to the second user equipment, wherein determining the control information includes determining the data transmission format including determining the MCS, and includes determining an arrangement of the reference symbol in the transmission subframe.

15. The method according to claim 14, wherein the plurality of formats of control information includes a first format, and the first format includes transmission priority information, and the transmission priority information is applied to a current D2D communication scenario.

16. The method according to claim 15, wherein the plurality of formats of control information includes a second format, and the second format does not include the transmission priority information.

17. The method according to claim 14, wherein the wireless communication system further includes a base station, and the transmitter is configured to transmit a D2D Scheduling Request (SR) to the base station with a Physical Uplink Control Channel (PUCCH).

18. A non-transitory computer readable medium having computer readable instructions stored therein that when executed by a processor, cause the processor to implement a method for performing device-to-device (D2D) communication in a wireless communication system including at least a first user equipment and a second user equipment, the method comprising:
    transmitting, by the first user equipment, control information to the second user equipment via a physical channel, wherein
        the control information includes data transmission format information, the data transmission format information includes information on a Modulation and Coding Scheme (MCS) indicating a modulation and coding format, and
        the control information has a plurality of formats for indicating different formats of the plurality of formats correspond to different arrangement of a reference symbol in a transmission subframe; and
    determining, by the first user equipment including a user interface, the control information to be transmitted by the transmitter of the first user equipment directly to the second user equipment, wherein determining the control information includes determining the data transmission format including determining the MCS, and includes determining an arrangement of the reference symbol in the transmission subframe.

19. The non-transitory computer readable medium according to claim 18, wherein the plurality of formats of control information includes a first format, and the first format includes transmission priority information, and the transmission priority information is applied to a current D2D communication scenario.

20. The non-transitory computer readable medium according to claim 19, wherein the plurality of formats of control information includes a second format, and the second format does not include the transmission priority information.

21. The non-transitory computer readable medium according to claim 18, wherein the wireless communication system further includes a base station, and the transmitter is configured to transmit a D2D Scheduling Request (SR) to the base station with a Physical Uplink Control Channel (PUCCH).

* * * * *